Figure 1:
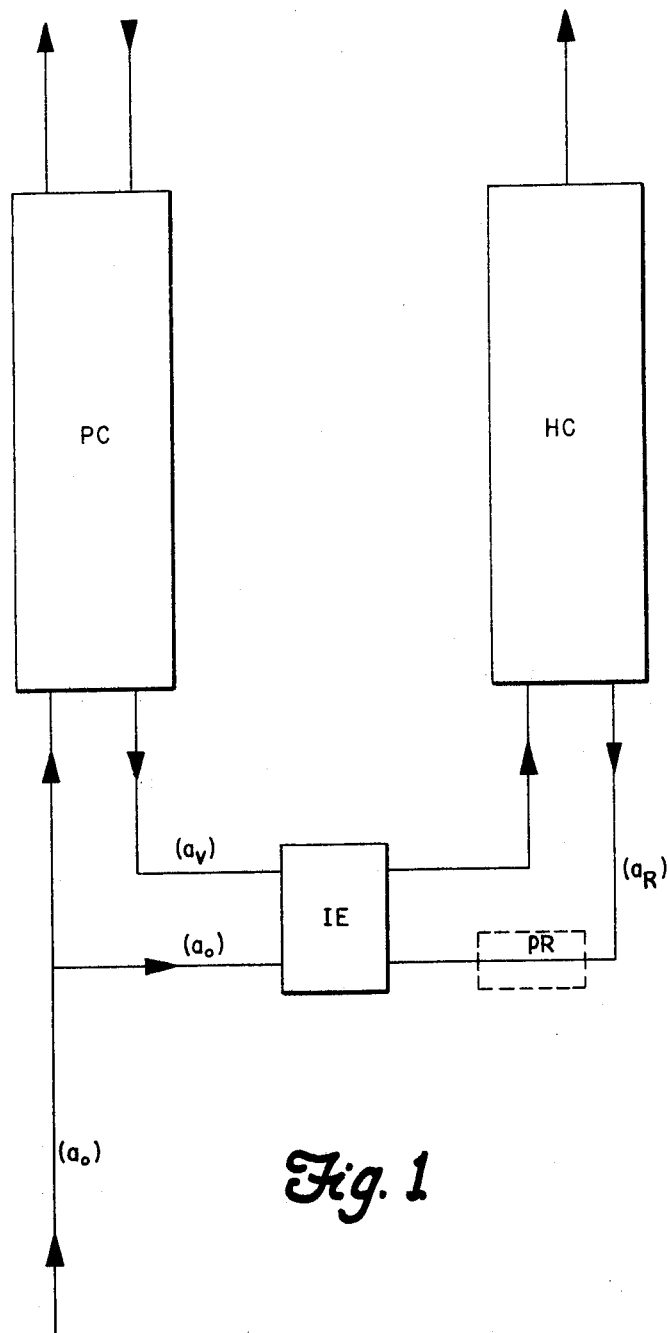

March 31, 1970 T. E. SCHUNCK 3,503,710
METHOD OF ISOTOPE CONCENTRATION
Filed Jan. 17, 1962 2 Sheets-Sheet 1

INVENTOR.
THEODOR E. SCHUNCK
BY
ATTORNEY

United States Patent Office 3,503,710
Patented Mar. 31, 1970

3,503,710
METHOD OF ISOTOPE CONCENTRATION
Theodor Ernst Schunck, Dortmund, Germany, assignor to Friedrich Uhde G.m.b.H., Dortmund, Germany, a German company
Filed Jan. 17, 1962, Ser. No. 166,958
Claims priority, application Germany, Jan. 24, 1961, U 7,745
Int. Cl. C01b 5/02
U.S. Cl. 23—204                 3 Claims The present invention relates to the recovery of isotopes from liquids or gases, and more particularly to the pre-concentration in an isotope recovery process consisting of two or more stages.

It is well known that quite a number of chemical elements exist in two or more atomic forms with different atomic weights, which forms are called isotopes. Also various processes are known with the aid of which the desired isotope can be recovered from liquids or gases in lower or higher concentration. In particular for reasons of saving energy some of these processes can advantageously be applied for the pre-concentration of the isotope to be obtained, whereas others on the strength of their method of operation are particularly suitable for the high-concentration, i.e., for the further processing of an already sufficiently pre-enriched medium. In order to attain in each case the optimum conditions for the pre-concentration as well as for the high-concentration it is advisable to split up the isotope recovery in two or more stages and to apply different processes for the individual stages.

For reasons of energy consumption and scope of equipment the product to be used as charging stock for the high-concentration stage must be enriched in isotope content in the pre-concentration stage, so that it has an isotope content of not less than a certain minimum amount. This minimum content is given the symbol $(a_v)$. The enrichment of the desired isotope is in many of the known processes for the production of isotopes obtained by contacting the liquid or gas containing the isotope with a second medium which also contains the desired isotope and from which the isotope is under suitable conditions transferred to the first medium. As a consequence of such an isotope exchange the reflux coming from the high-concentration stage and which has been in contact with the medium to be concentrated to a high degree, has a concentration $(a_R)$ which is lower than that of the medium flowing from the pre-concentration stage to the high-concentration stage $(a_R < a_v)$. Normally this reflux is mixed with the medium fed to the plant as isotope source and which in general has a natural isotope concentration $(a_o)$ which is lower than that of the reflux $(a_o < a_R)$.

As an example in a known two-stage process for the production of deuterium by means of isotope exchange between hydrogen and water the water coming from the high-concentration stage with a medium concentration is mixed with the fresh water fed and led to the gas generation plant for the production of hydrogen. Such a method of operation has, however, several disadvantages. As an example the isotope concentration $(a_m)$ of the mixture may for reasons of equilibrium not be lower than the value called for by the value of the equilibrium constant and by the required pre-concentration. For this reason the mixing ratio of fresh water and reflux is limited and the operation of the plant is rendered more difficult. Furthermore, any mixing of isotope streams of different concentration requires an extension of the subsequent exchange equipment or in case the size of this exchange equipment is not enlarged a reduction in the yield of the desired isotope results.

It is an object of this invention to provide an efficient and economical process for the production in two or more stages of isotopes from gases or liquids in which the desired isotopes are obtained by means of isotope exchange.

It is another object of this invention to provide a new and improved process for increasing the concentration of at least one isotope of an element in a medium in which this isotope exists in a small amount, without the isotope concentration being reduced in any process stage by mixing the medium enriched with this isotope with a medium which has a lower isotope content.

It is a more specific object of this invention to bring the reflux coming from the high-concentration stage to the isotope concentration $(a_o)$ of the medium which is fed to the total plant as isotope source. Other objects of the invention will appear hereinafter.

According to the present invention the process for the production of isotopes from liquids or gases in two or more process stages arranged in series is carried out in such a way that the reflux coming from a high-concentration stage, wherein the reflux was in isotope exchange with the medium in which the isotopes were enriched so that the concentration of the reflux was reduced to a medium concentration $(a_R)$, is brought in isotope exchange relation with the feed to the high-concentration stage thereby enriching said feed to a pre-concentration $(a_v)$.

Figure 2:
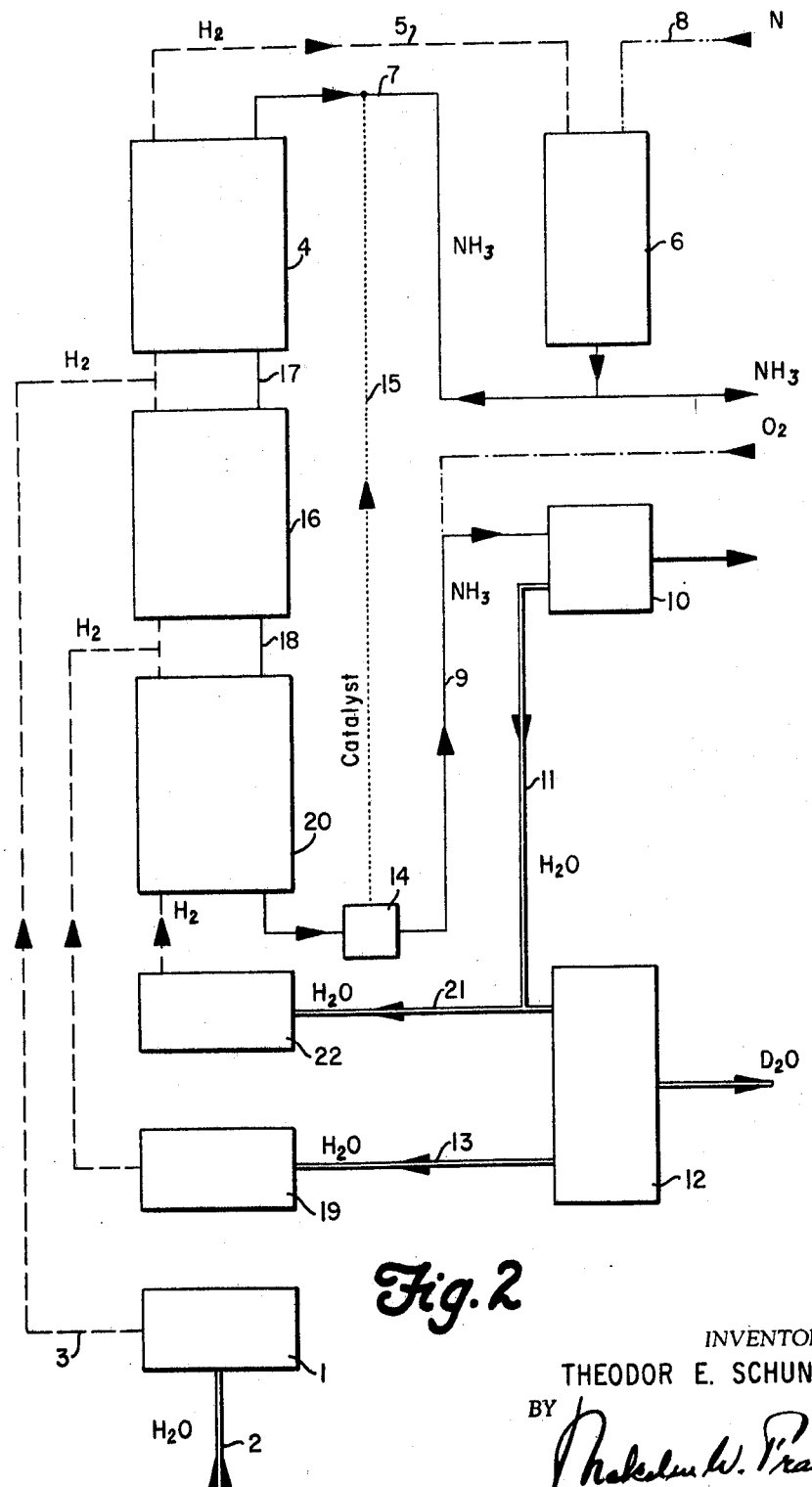

The principles of the invention are illustrated in the drawings in which:

FIG. 1 is a diagrammatic illustration of the general principles of the invention; and FIG. 2 is a diagrammatic representation of an apparatus for the production of deuterium by isotope exchange between ammonia and water.

The general scope of the process according to the invention will be described as shown in FIG. 1. In FIG. 1 the reflux coming from a high-concentration plant (HC) is, if necessary, led to a separate phase reversal plant (PR) and the medium obtained thereby conducted to a small isotope exchange column (IE). Through this column (IE) the medium coming from the pre-concentration column (PC) flows in counter current. In case a catalyst is required for the carrying out of the isotope exchange this catalyst can either be contained in the small isotope exchange column (IE) as liquid bed or in suspended form or may be carried along in the medium suspended or dissolved. The small isotope exchange column (IE) is so designed that the concentration of the medium obtained from the reflux is reduced to that of the medium fed to column (PC) $(a_o)$. Only then is it mixed with the medium which is fed to the pre-concentration stage (PC). The course of a process according to the invention will be more readily apparent by reference to the following detailed description of the isotope exchange between ammonia and hydrogen for the production of deuterium when taken in connection with the accompanying FIG. 2.

In FIG. 2, water 2 with an isotope concentration $(a_o)$ is decomposed in phase reversal stage 1 into hydrogen and oxygen. The hydrogen is led via line 3 to isotope exchange column 4. After the deuterium concentration is reduced in this column in a way which will be described later, the hydrogen is transferred via line 5 to synthesis plant 6, after nitrogen is mixed in via line 8. A part of the ammonia obtained in synthesis plant 6 is diverted and brought in liquid form through line 7 to the top of isotope exchange column 4. In this column the ammonia flows in counter current to the hydrogen, the deuterium content of which is to be reduced. In case a catalyst is to be carried along by the liquid ammonia, this catalyst is introduced into the ammonia stream at the top of isotope exchange column 4 via line 15.

The ammonia enriched with deuterium by isotope exchange leaves isotope exchanger 4 via line 17 and enters the top of isotope exchanger 16. In this exchanger the ammonia is contacted with a counter-current flow of hydrogen which consists of two components. One component is the hydrogen obtained from reflux 13 coming from the high-concentration section 12 in phase reversal section 19. This component has an isotope concentration of ($a_R$). The other component is taken from the top of isotope exchange column 20. This column is so designated that the isotope concentration of its top product is also ($a_R$). The ammonia coming from exchanger column 16 enters the top of column 20. The ammonia leaving exchanger column 20 has then, due to the isotope exchange, the desired pre-concentration of ($a_v$). In case catalyst is carried along by the ammonia, this catalyst may be separated from the ammonium in separator 14 and recycled as described above via line 15. The ammonia passes through line 9 to combustion plant 10 in which it is oxidized to water and nitric oxide. A part of the water of combustion with an isotope concentration of ($a_v$) is diverted to high-concentration section 12, whereas the balance goes to phase reversal section 22 in which it is decomposed into hydrogen and oxygen.

The hydrogen obtained in this way and which has an isotope concentration ($a_v$) is introduced into the bottom of exchanger column 20 where it contacts ammonia in counter current. From the high-concentration section 12 comes an efflux 13 the deuterium content of which ($a_R$) lies between the deuterium content of the pre-enriched water ($a_v$) and that of the feed water ($a_0$) used as isotope source. This efflux is then led as already mentioned above to phase reversal section 19.

EXAMPLE 1200 kmol/hr. of water with a natural heavy water content enter electrolyzer 1 via line 2 and are there decomposed into oxygen and 1200 kmol of hydrogen. The isotope deuterium concentration of this hydrogen corresponds to its natural concentration ($a_0=1$). This hydrogen then flows via line 3 to main column 4 after first being mixed with the hydrogen leaving the top of column 16.

Through column 4, 1500 kmol of hydrogen flow counter current to liquid ammonia. Due to isotope exchange a part of the deuterium is transferred from the hydrogen to the ammonia and forms there NH$_2$D. At the top of this column the deuterium content of the hydrogen is reduced to 62.5% of its natural concentration. This hydrogen then goes to the synthesis plant 6 in which, after being mixed with 500 kmol of nitrogen, 1000 kmol of ammonia are produced. The NH$_2$D content of this ammonia also corresponds to only 62.5% of its natural concentration.

Of this ammonia 200 kmol are oxidized to nitrous gases, whereas 800 kmol will be available as such. The ammonia to be oxidized is liquefied and fed via line 7 to the top of main column 4; before entering this column the catalyst is mixed in via line 15. Due to the deuterium exchange in column 4 the NH$_2$D content of the ammonia is raised in this column to its 2.5-fold.

As a result of the isotope exchange with the hydrogen of higher deuterium concentration flowing in counter current in columns 16 and 20 the NH$_2$D content of the ammonia is raised to 10-fold the natural concentration.

After the catalyst is removed from the ammonia in 14, 250 kmol of oxygen are added to the ammonia. In the combustion plant 10 nitrous gases are obtained in an amount of 200 kmol calculated as NO. The 300 kmol of water obtained from the combustion gas by condensation contain 10 times as much deuterium as natural water.

A part stream of 56.25 kmol is diverted to high-concentration section 12 in which 0.0675 kmol of heavy water are produced. Furthermore in this section are also obtained as reflux 56.25 kmol of water with twice the natural concentration. These are decomposed in electrolyzer 19 and the hydrogen obtained thereby, which has twice the natural deuterium content, is led to the bottom of column 16.

Before entering column 16 this hydrogen is combined with the hydrogen which is obtained in electrolyzer 22 from the rest of 243.75 kmol of combustion water and which hydrogen like the combustion water is enriched 10-fold; however, in column 20 its deuterium content has been reduced to a 2-fold concentration. Column 16 is so designed that the hydrogen leaves it with its natural D$_2$ concentration.

If, in deviation from the principle of the invention, fresh water 2 and effluxes 13 and 21 or the gas coming from electrolyzers 1, 19 and 22 were mixed and led to a single exchanger column the deuterium content of the gas at the bottom of this column would only have been 2.5-fold the natural concentration. To obtain the desired 10-fold enrichment before entering the high-concentration section the concentration equilibrium would have to be adjusted at the bottom of this column, which could only have been achieved—and then only approximately—by means of a very high column.

Without following the principle of the invention the enrichment obtained in the above example could also have been attained with a single column, provided the amount of reflux 7 is increased to 400 kmol. This would mean that the amount of free, available ammonia would have been reduced to 600 kmol and that the utilization of the electrolyzer would have been less, since the only 900 kmol fresh water would have been processed. Furthermore, the column required for this purpose would have 2.5 times the volume of the total volume of the three columns 4, 16 and 20.

Although many other examples of isotopes and exchange media might be given, it is believed that the above example clearly indicates the wide scope and general applicability of the process of the invention.

On the other hand, it will be obvious to anyone skilled in the art that many other modifications and embodiments of the above described details of the process can be made without departing from the principle of the invention.

I claim:

1. A multistage process for producing deuterium enriched water comprising, in a preconcentration stage conducting counter current isotope exchange between hydrogen and ammonia in a series of isotope exchange zones, wherein normal deuterium content hydrogen efflux from an intermediate exchange zone is exchanged with ammonia of relatively low deuterium content in the first of said zones, hydrogen efflux of enriched deuterium content from the last of said zones is exchanged in an intermediate zone with ammonia efflux of enriched deuterium content from said first zone, hydrogen of relatively high deuterium content is exchanged in the last of said zones with ammonia efflux of relatively high deuterium content from said intermediate zone; feeding ammonia efflux of highly enriched deuterium content from said last zone into a combustion zone for reaction with oxygen to produce a water product of highly enriched deuterium content, recycling a portion of said water product to said preconcentration stage wherein it is electrolyzed to produce hydrogen of relatively high deuterium content which is fed into the last of said exchange zones, feeding another portion of said water product to a high concentration stage to produce a more concentrated deuterium enriched water, recovering reflux water from said high concentration stage and electrolyzing it to obtain hydrogen enriched deuterium content which is fed into said intermediate zone; and feeding hydrogen efflux of relatively low deuterium content from said first exchange zone into an ammonia synthesis zone for reaction with deuterium-free nitrogen to produce ammonia of relatively low deuterium content which is fed into said first exchange zone.

2. The process of claim 1, wherein water of normal deuterium content is electrolyzed and the hydrogen obtained is commingled with the hydrogen efflux from said intermediate exchange zone.

3. The process of claim 1, wherein a catalyst is introduced into said ammonia of relatively low deuterium content before it is fed into said first exchange zone, said catalyst being circulated through said exchange zones and removed from said ammonia efflux from said last zone.

References Cited

UNITED STATES PATENTS

| 2,997,369 | 8/1961 | Hesky | 23—204 |
| 3,233,971 | 2/1966 | Delassus et al. | 23—204 X |

OTHER REFERENCES

Becher: "Angewandte Chemie," vol. 68, pp. 6–13 (1956).

MILTON WEISSMAN, Primary Examiner